United States Patent
Park et al.

(10) Patent No.: US 6,567,672 B1
(45) Date of Patent: May 20, 2003

(54) METHOD OF MAINTAINING OR TERMINATING DATA COMMUNICATION IN A FLIP TYPE MOBILE PHONE

(75) Inventors: Sang-Whan Park, Kyonggi-do (KR); Hee-Bong Kim, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/405,332

(22) Filed: Sep. 24, 1999

(30) Foreign Application Priority Data

Sep. 24, 1998 (KR) .......................................... 98-39748

(51) Int. Cl.[7] ................................................. H04B 1/38
(52) U.S. Cl. ...................... 455/550; 455/556; 455/574; 455/90
(58) Field of Search ................................ 455/466, 556, 455/557, 558, 569, 574, 343, 550, 575, 90

(56) References Cited

U.S. PATENT DOCUMENTS

| | | | |
|---|---|---|---|
| 5,175,759 A | * 12/1992 | Metroka et al. ............... 379/58 |
| 5,185,790 A | 2/1993 | Mischneko |
| 5,493,690 A | 2/1996 | Shimazaki |
| 5,608,781 A | * 3/1997 | Seiderman .................... 379/59 |
| 5,983,073 A | * 11/1999 | Ditzik ........................ 455/11.1 |
| 6,014,573 A | * 1/2000 | Lehtonen et al. ........... 455/569 |
| 6,023,470 A | * 2/2000 | Lee et al. .................... 370/401 |
| 6,094,565 A | * 7/2000 | Alberth et al. ................ 455/90 |

FOREIGN PATENT DOCUMENTS

KR 1997-78127 12/1997

* cited by examiner

Primary Examiner—Lester G. Kincaid
Assistant Examiner—Ronald J. Ward
(74) Attorney, Agent, or Firm—Dilworth & Barrese, LL

(57) ABSTRACT

A flip type or folder type mobile phone for wireless communication with a base station, which includes a movable part so as to define an open or closed position and an opening/closing sensor for generating an open or close signal according to the open or closed position, the opening/closing sensor being enabled or disabled by an enable or disable signal, whereby the mobile phone terminates a communication channel according to said open or close signal. A communication method is also disclosed and includes the steps of establishing a communication channel between the mobile phone and the base station; and generating a disable signal during data communication to disable the opening/closing sensor from generating the close signal thereby maintaining the communication channel.

17 Claims, 6 Drawing Sheets

METHOD OF MAINTAINING OR TERMINATING DATA COMMUNICATION IN A FLIP TYPE MOBILE PHONE

CLAIM OF PRIORITY

This application makes reference to, incorporates the same herein, and claims all benefits accruing under 35 U.S.C. §119 from an application entitled METHOD OF MAINTAINING OR TERMINATING DATA COMMUNICATION IN A FLIP TYPE MOBILE PHONE earlier filed in the Korean Industrial Property Office on Sep. 24, 1998, and there duly assigned Serial No. 39748/1998.

BACKGROUND OF THE INVENTION

1. Field of the Invention

The present invention relates to a method of operating a flip or folder type mobile phone, and more particularly, a method of maintaining or terminating data communication performed in such a mobile phone.

2. Description of the Related Art

A flip-up or flip-down type mobile phone has a flip cover plate which, when performing communication, is opened by being flipped up or down from the main body of the phone. A folder type mobile phone comprises two foldable bodies, both containing electronic circuits, one of which holds a main body of the phone while the other holds a speaker or an LCD (liquid crystal display). Thus, both flip type and folder type mobile phones comprise two parts hinged together, one of which may be rotated along the hinge for the mobile phone to assume an open or closed position. Hereinafter, the term "flip type" will be used to also include "folder type".

The open or closed position (operational state) of such a flip type mobile phone can be detected by using various means, for example, a member moveable with the flip as in U.S. Pat. No. 5,185,790, variation of an electromagnetic field as in U.S. Pat. No. 5,493,690, and an optical sensor as in Korean Patent No. 97-78127. When the flip type mobile phone is opened in response to a call signal, a communication channel is established. When the flip is returned to the closed position after completing the call, the communication channel is terminated.

As communication technology develops, mobile phones are being provided with additional functions such as facsimile, electronic mail, video, data communications, etc. However, conventional mobile phones do not properly accommodate such additional functions. For example, when the flip of a conventional mobile phone is closed during data communication such as file transfer, the data communication is terminated, despite there being no need for the flip of the mobile phone to be kept open during such data communication. In fact, by having to keep the flip of the mobile phone open during data communication, the portability of the mobile phone is reduced. Furthermore, if the flip of the conventional mobile phone is inadvertently closed before completing data communication, the communication channel is cut off, thereby leading to an additional fee as the data communication needs to be repeated from the beginning, once the channel is re-established. Therefore, allowing the flip of the mobile phone to be closed during data communication would be desirable.

SUMMARY OF THE INVENTION

It is an object of the present invention to provide a mobile phone for and a method of maintaining data communication performed in a flip type mobile phone regardless of whether the flip is opened or closed.

It is another object of the present invention to provide a mobile phone for and a method of automatically terminating a communication channel if no change is detected in the operational state of the mobile phone within a given time after completing data communication.

It is still another object of the present invention to provide a mobile phone for and a method of informing a user of a mobile phone that data communication is completed.

It is still another object of the present invention to provide a mobile phone for and a method of terminating the communication channel if the mobile phone is repeatedly opened and closed.

One embodiment of the present invention sets out a mobile phone which includes a movable part capable of being positioned in an open or closed position; a sensor for generating an open or close signal according to the open or closed position, whereby a communication channel is terminated depending on the open or close signal; and a controller for determining whether an established communication represents data communication and for generating a signal for enabling or disabling the sensor from generating the open or close signal, the controller generating the disable signal during data communication to disable the sensor, thereby maintaining the communication channel regardless of the open or close signal.

Another embodiment of the present invention sets out a mobile phone which includes a movable part capable of being positioned so as for the mobile phone to be in an open or close position; a sensor for generating an open or close signal according to the open or close position; and a controller for determining whether an established communication represents a data communication and for maintaining the communication channel during the data communication regardless of the open or close signal.

The present invention further sets out a communication method comprising the steps of establishing a communication channel between a mobile phone and a base station, and generating a disable signal during data communication to disable an opening/closing sensor from generating a close signal, thereby maintaining said communication channel.

An additional embodiment of the present invention sets out a method for wireless communication between a base station and a flip or folder type mobile phone, in which the mobile phone includes two parts connected by a hinge mechanism so as to assume an open or closed position, an opening/closing sensor for generating an open or close signal according to the open or closed position, the opening/closing sensor being enabled or disabled by an enable or disable signal, whereby the flip or folder type mobile phone establishes or terminates a communication channel according to the open or close signal, the method comprising the steps of establishing a communication channel between the base station and the flip or folder type mobile phone, and generating the disable signal so as to maintain the communication channel during data communication even when the flip is closed, while generating the enable signal so as to terminate the communication channel during voice communication when the flip is closed.

Yet a further embodiment of the present invention sets out a method for wireless communication between a base station and a flip or folder type mobile phone, in which the mobile phone includes two parts connected by a hinge mechanism so as to assume an open or closed position, an opening/closing sensor for generating an open or close signal according to the open or closed position, the opening/closing sensor being enabled or disabled by an enable or disable signal, whereby the flip or folder type mobile phone establishes or terminates a communication channel according to the open or close signal, the method comprising the steps of establishing a communication channel between the base station and the flip or folder type mobile phone, and maintaining the communication channel during data communication even when the close signal is generated, while terminating the communication channel during voice communication when the close signal is generated.

The present invention will now be described more specifically with reference to the drawings attached by way of example only.

DETAILED DESCRIPTION OF THE PREFERRED EMBODIMENT

Figure 1:
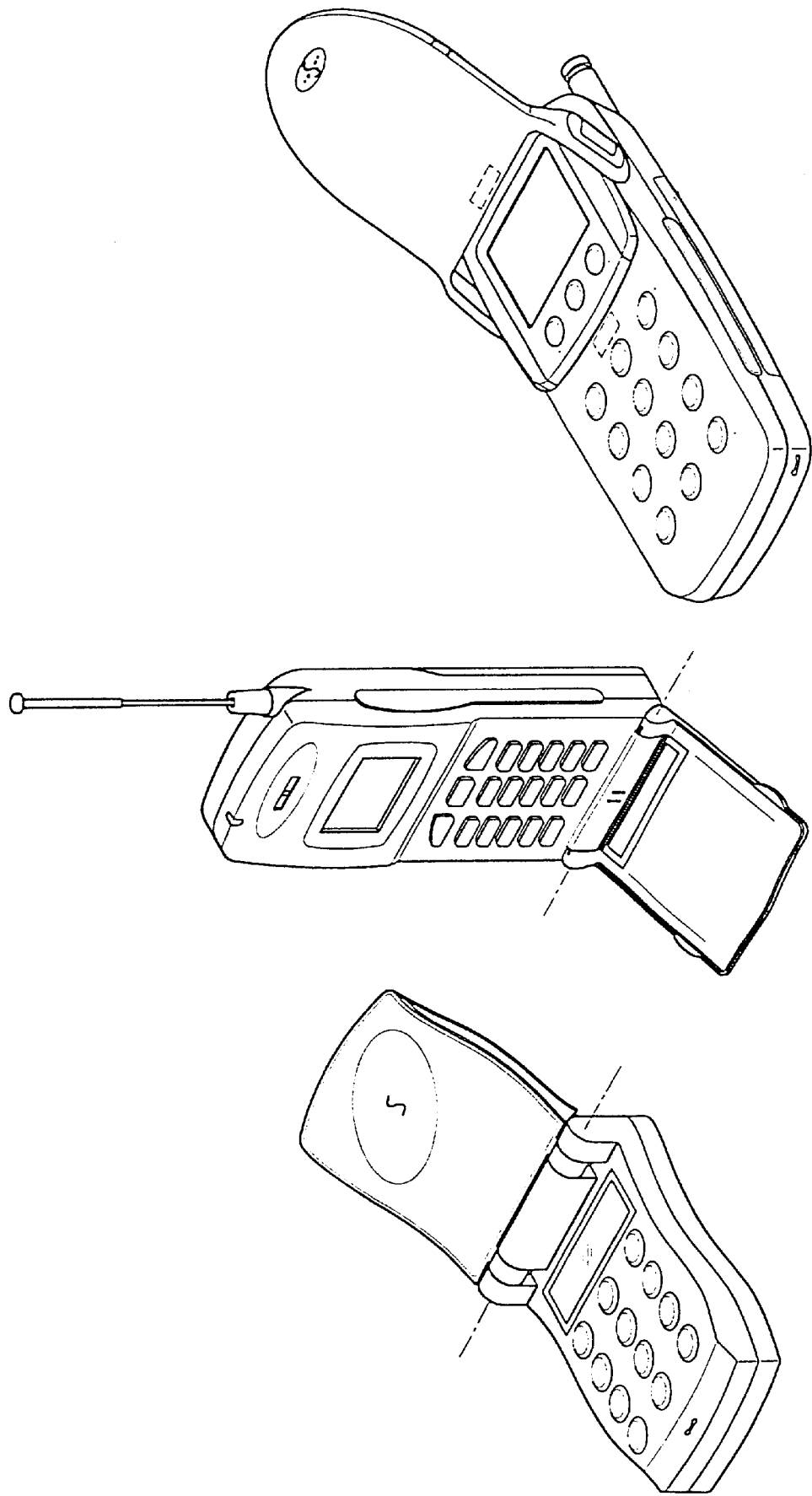
FIG. 1 illustrates perspective views of varieties of flip type mobile phones.

Referring to FIG. 1, three types of a flip type mobile phone are shown. A folder type, shown at the right of the drawing, comprises a first part with a speaker and a second part with a key pad and display, which are hinged together so to be capable of being folded together. A flip-down type, shown in the center of the drawing, has a flip cover which turns downward to open the mobile phone. A flip-up type, shown at the left of the drawing, has a flip cover which turns upward to open the mobile phone. Flip type mobile phones may therefore be placed in an open or closed position, and open or close signals may be generated to establish or terminate a communication channel. As mentioned, the term "flip type" will also be used to include "folder type".

Figure 2:
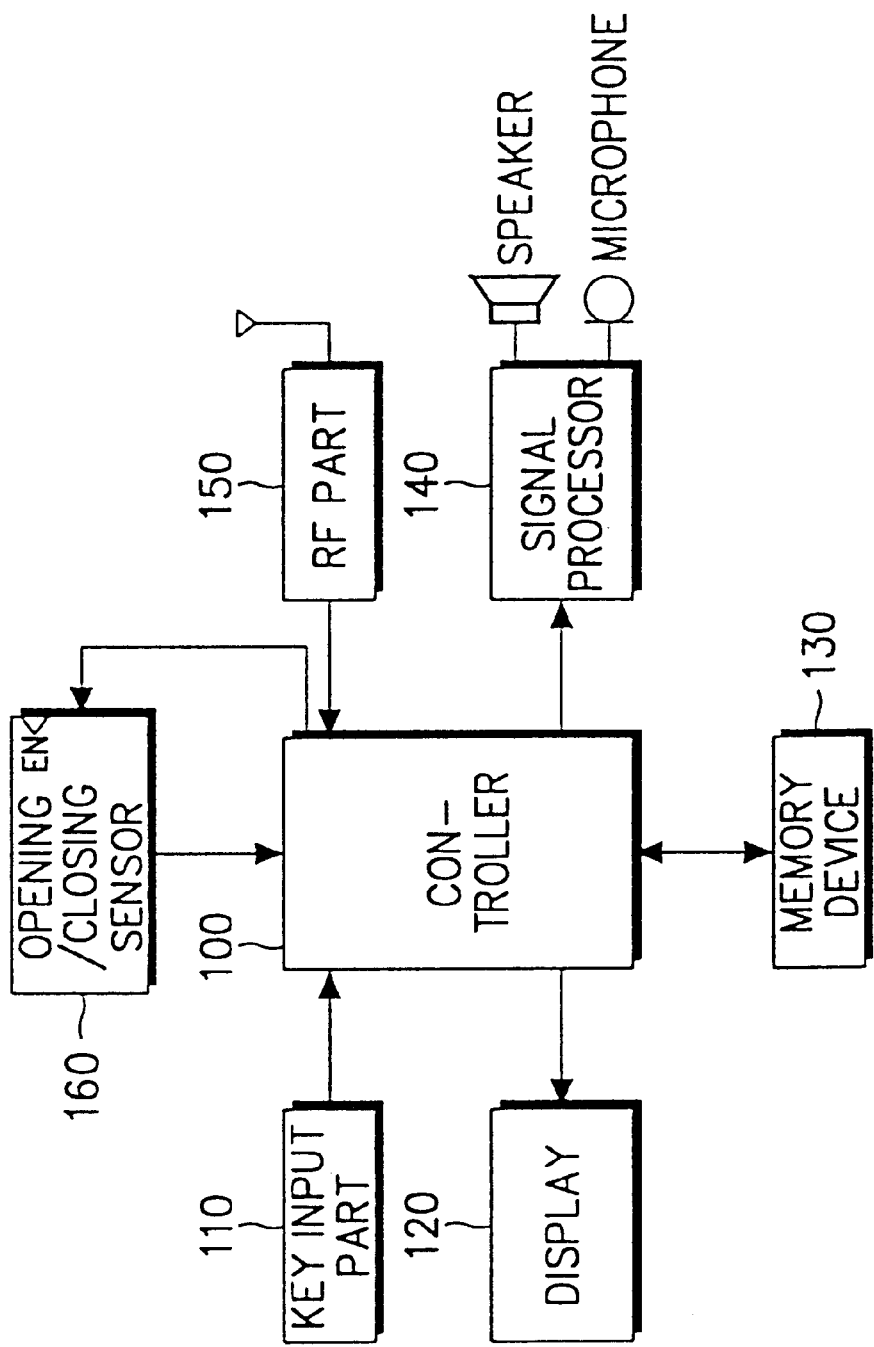
FIG. 2 is a block diagram for illustrating the structure of a flip type mobile phone according to the present invention.

Referring to FIG. 2, a controller 100 which controls the functions of the flip type mobile phone is shown. A memory device 130 includes a ROM for storing an operating program, an electrically erasable and programmable read only memory (EEPROM), and a RAM. A display 120 such as a liquid crystal display (LCD) displays an operational state of the mobile phone and a procedural state of the operating program. A key input part 110 includes a plurality of alphanumeric keys and various functional keys to input key data to the controller 100. A radio frequency (RF) part 150 transmits and receives data to and from a base station through an antenna. A signal processor 140 modulates a sound signal input through a microphone into sound data, and demodulates sound data received from the RF part into a sound signal outputted through a speaker. An opening/closing sensor 160 senses an operational position (open or closed position) of the flip of the mobile phone to generate an open or close signal. The opening/closing sensor 160 is disabled or enabled by a control signal ("DISABLE" or "ENABLE") of the controller 100. The sensor may be mechanical as shown in U.S. Pat. No. 5,185,790, electromagnetic as shown in U.S. Pat. No. 5,493,690, optical as shown in Korean Patent No. 97-78127, or of yet an alternative type.

Figure 3:
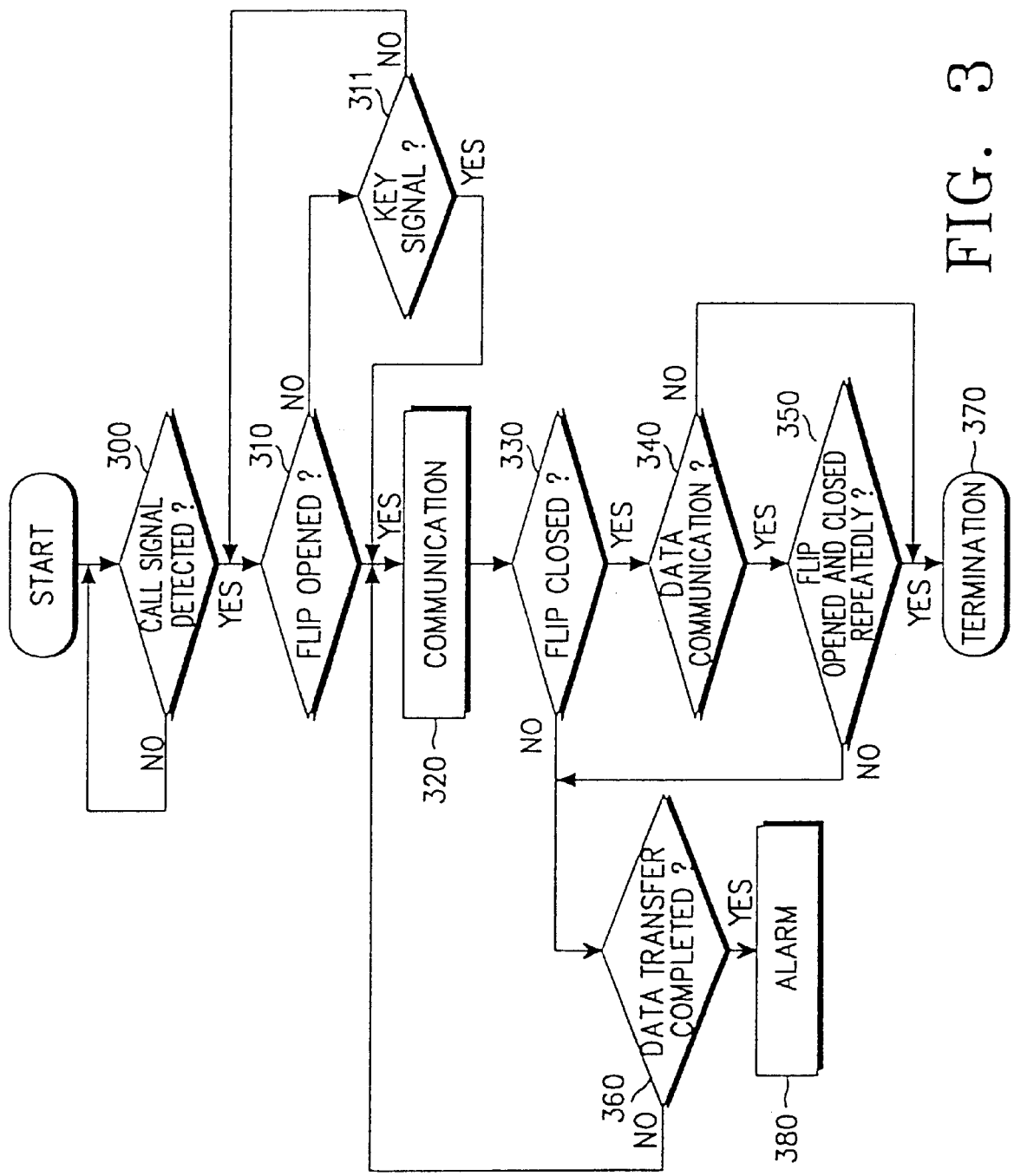
FIG. 3 is a flow chart for illustrating the process of maintaining or terminating a communication channel during data communication according to an embodiment of the present invention.

Describing the process of controlling the establishment or termination of the communication channel in data communication with reference to FIG. 3, the controller 100 proceeds to step 310 to determine whether the flip is opened, if a call signal is detected in step 300. When the controller 100 detects in step 310 an open signal from the opening/closing sensor 160 or a key signal from the key input part 110 to accept a call signal, the process goes to step 320 to establish the communication channel between the mobile phone and the base station. Subsequently, when a close signal of the opening/closing sensor 160 is detected in step 330, the process goes to step 340; otherwise, if a close signal is not detected in step 330, the process goes to step 360. If the flip is closed (i.e., a close signal is detected), the controller 100 determines in step 340 whether the established communication represents data communication. This is achieved by call information predetermined during initialization for establishing the communication channel between the phone and the base station. Table 1 shows the call information of a CDMA mobile phone. Hereinafter, communication not representing data communication shall be called voice communication.

TABLE 1

| | |
|---|---|
| VOICE COMMUNICATION | CAI_SO_VOICE_IS96A CAI_SO_VOICE13K CAI_SO_VOICE_IS96 • • • |
| DATA COMMUNICATION | CAI_SO_ASYNC_DATA CAI_SO_FAX_DATA CAI_SO_PACKET_DATA • • • |

If the controller determines from Table 1 that the established communication represents data communication, the process goes to step 350 to detect whether the flip is opened and closed repeatedly. When the flip is repeatedly opened and closed, the communication channel is terminated in step 370. Otherwise, the process goes to step 360 to detect whether the data communication is completed. Upon detecting that the data communication is completed, the process goes to step 380 to generate an alarm message so as to inform a user of the completion of the data communication; otherwise, the process returns to step 320. The alarm message may be a statement such as "Data transfer completed! Terminate? Y/N", displayed on the display 120. Alternatively, the user may be notified of the alarm message by ringing or synthesized voices broadcast through the speaker.

Figure 4:
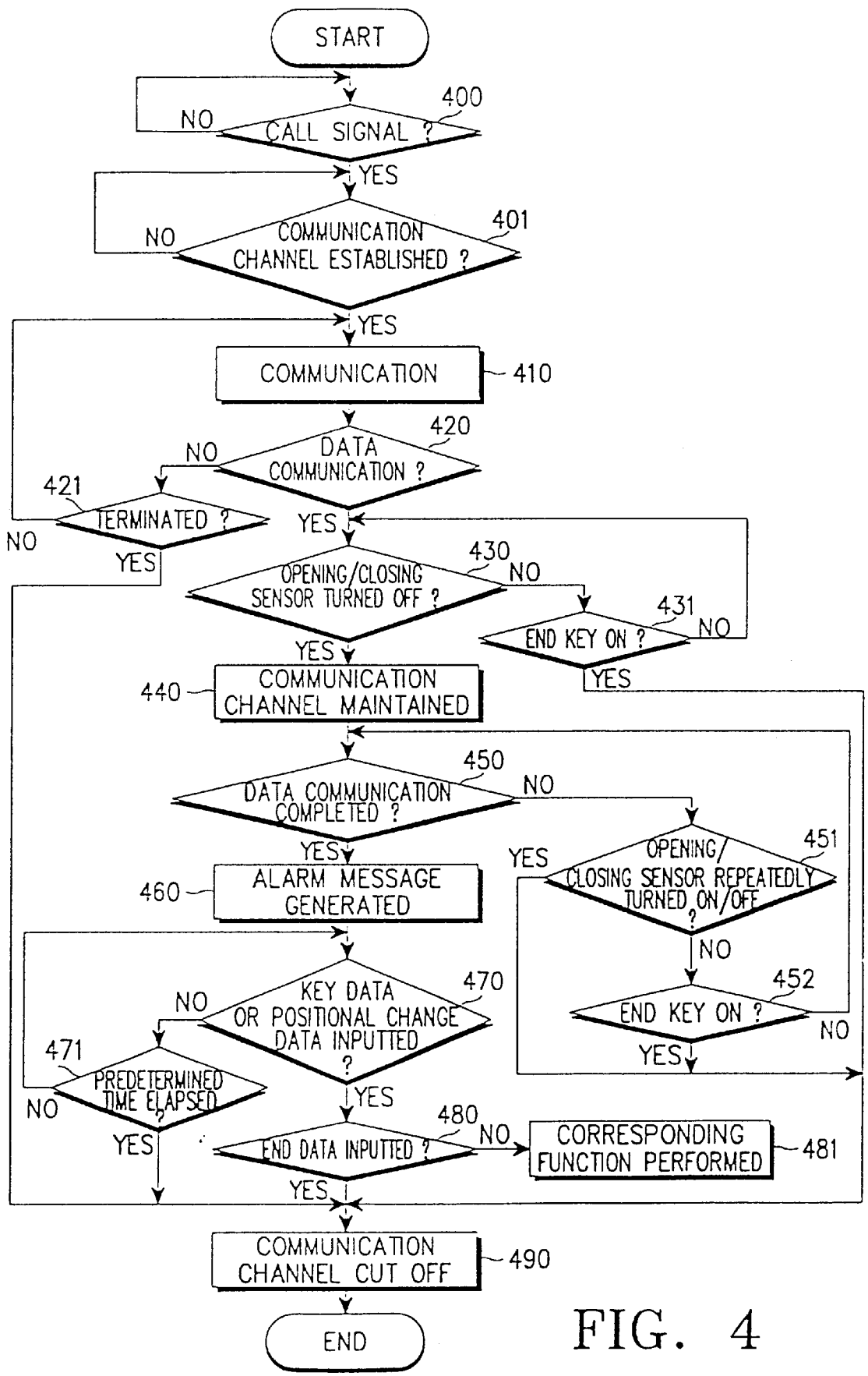
FIG. 4 is a flow chart for illustrating the process of maintaining or terminating the communication channel during data communication according to another embodiment of the present invention.

Another embodiment of the invention is depicted in FIG. 4. When the controller 100 detects a call signal in step 400, the process in step 401 attempts to detect a signal for establishing the communication channel; otherwise, the process returns to step 400. The signal for establishing the communication channel may be the open signal of the opening/closing sensor 160 or a key signal inputted through the key input part 110. Generally, if the flip cover is opened, then the communication channel is to be established. Thus, if the signal for establishing the communication channel is detected in step 401, the process goes to step 410 to establish communication. Subsequently, if the established communication is not found to be data communication in step 420, the process goes to step 421. If the controller 100 detects termination data in step 421, such as the close signal of the opening/closing sensor 160 or end key data inputted through the key input part 110, the process goes to step 490 to terminate the communication channel; if the termination data is not detected, the process returns to step 410.

If in step 420 the established communication is found to be data communication, the process goes to step 430. Even if the controller 100 detects in step 430 the close signal of the opening/closing sensor 160, the process goes to step 440 to maintain the communication channel for the data communication; otherwise, the process goes to step 431 to attempt to detect an end key signal from the key input part 110. If the end key signal is detected, the process goes to step 490 and the communication channel is terminated.

After maintaining the communication channel in step 440, the process proceeds to step 450. In step 450, the controller 100 checks whether the data communication is completed. If it is completed, the process goes to step 460 to generate the alarm message displayed on the display 120, and then moves on to step 470. The message generated in step 460 may be a statement such as "Data transfer completed! Terminate? Y/N". Alternatively, the user may be notified of the alarm message by ringing or by synthesized voices broadcast through the speaker. If data communication is not complete, the process proceeds to step 451, where the controller 100 determines if the open/close signal of the opening/closing sensor 160 is detected at a given number of times in a given time period; for example, three times or more in three seconds. If so, the process goes to step 490, and the communication is terminated; otherwise, the process goes to step 452, to determine if the end key of the key input part 110 is turned on. If so, the process goes to step 490; otherwise, the process returns to step 450.

Returning to step 470, if the controller 100 detects in step 470 key data from the key input part 110 or data from the opening/closing sensor 160 representing positional change of the flip ("positional change data"), the process goes to step 480; otherwise, the process goes to step 471. In step 471, if the controller 100 does not detect any key input or the positional change data in a given time after completing the data communication, the process goes to step 490, and terminates the communication channel; otherwise, the process returns to step 470. In step 480, the controller 100 checks whether end data has been input, either by the end key or by repeated signals of opening/closing sensor 160. If the end data is detected in step 480, the process goes to step 490 and the communication is terminated; otherwise, the process goes to step 481 to perform the corresponding function.

Summarizing the description of the embodiments as shown in FIGS. 3 and 4, the communication channel is maintained during data communication even when the mobile phone is closed and the close signal is generated by the opening/closing sensor 160. When the data communication is completed, the alarm message is generated, and then, in FIG. 4, the communication channel is cut off if no key data or positional change data is generated after the lapse of a given time. When the close/open signals are repeatedly generated a given number of times in a given time during data communication, the communication channel is cut off as if the end key had been input.

Figure 5:
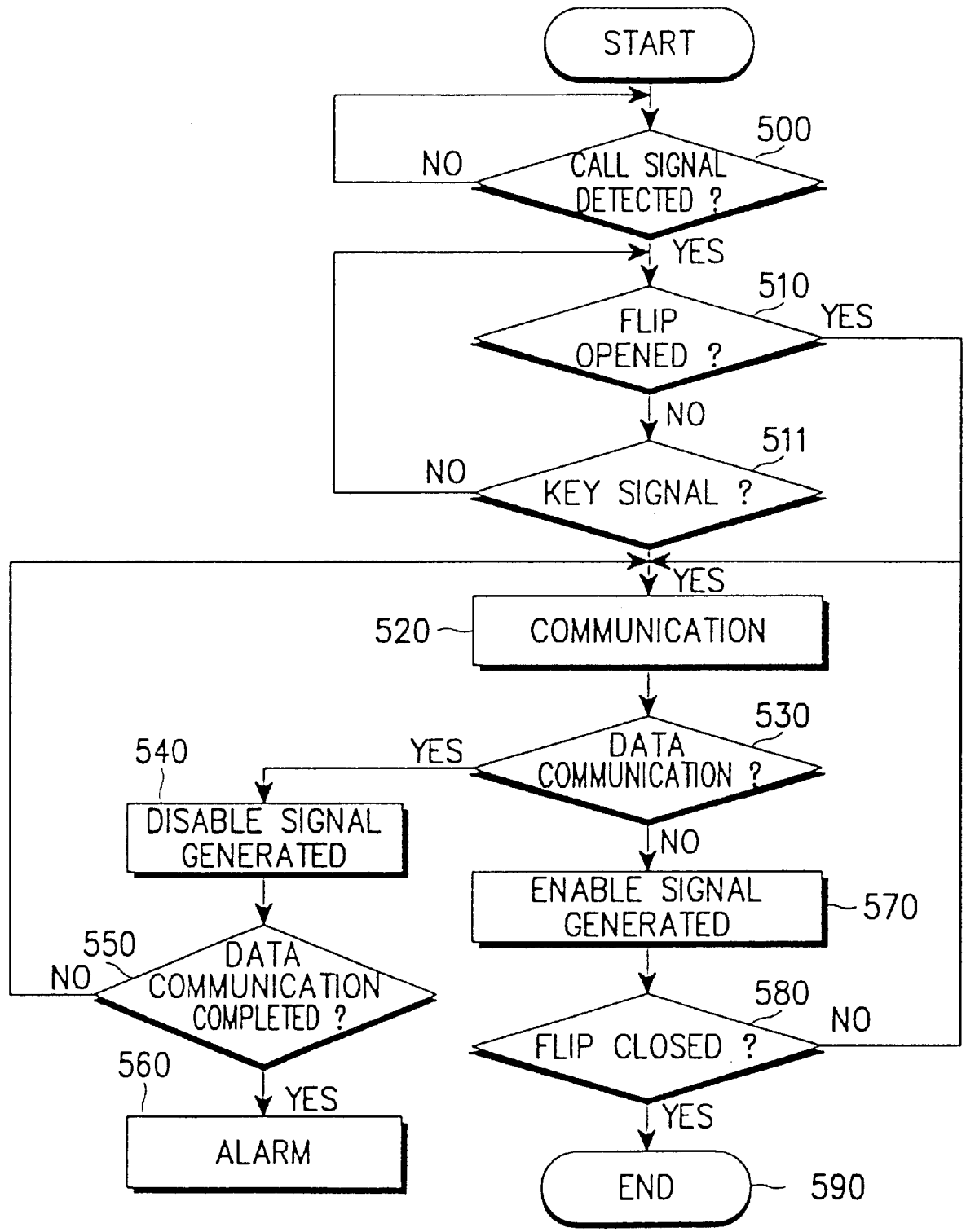
FIG. 5 is a flow chart for illustrating the process of maintaining or terminating the communication channel during data communication according to still another embodiment of the present invention.

Describing the process of maintaining or terminating the communication channel during data communication in connection with an additional embodiment shown in FIG. 5, if a call signal is detected in step 500 the controller 100 proceeds to step 510 to determine whether the flip is opened. If the controller 100 detects in step 510 the open signal from the opening/closing sensor 160 or detects in step 511 a key signal from the key input part 110 for accepting the call signal, the process goes to step 520 to establish the communication channel between the phone and the base station. Subsequently, if the controller 100 finds in step 530 that the established communication represents data communication, the process goes to step 540 to generate a disable signal to disable the opening/closing sensor 160; otherwise, the process goes to step 570 to generate an enable signal to enable the opening/closing sensor 160. If the controller 100 detects in step 550 the end of the data communication, the process goes to step 560 to generate an alarm message, otherwise, the process returns to step 520. In step 560, the user is notified of the alarm message as described in connection with FIG. 3. If the opening/closing sensor detects in step 580 that the flip is closed, the process goes to step 590 to terminate the non-data communication; otherwise, the process returns to step 520.

Figure 6:
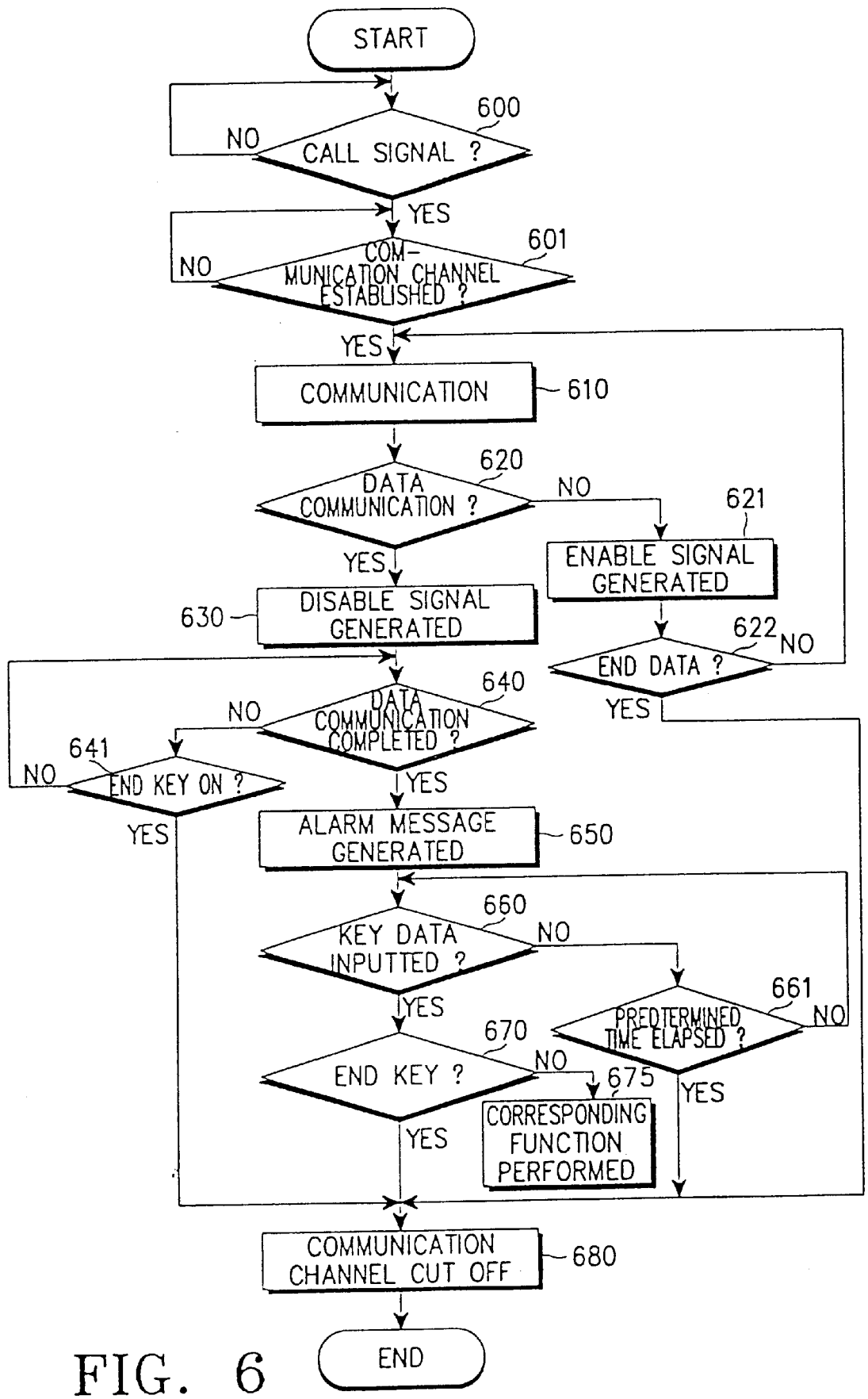
FIG. 6 is a flow chart for illustrating the process of maintaining or terminating the communication channel in data communication according to a further embodiment of the present invention.

A further embodiment of the invention is shown in FIG. 6. When the controller 100 detects a call signal in step 600, the process goes to step 601 to establish a communication channel. The signal demanding the establishment of the communication channel may be the open signal of the opening/closing sensor 160 or a communication key signal inputted through the key input part 110. If the communication channel is established in step 601, the process goes to step 610 to establish communication. Subsequently, if the established communication is found to be data communication in step 620, the process goes to step 630 to generate the disable signal to disable the opening/closing sensor 160; otherwise, the process goes to step 621 to generate the enable signal to enable the opening/closing sensor 160.

In step 640, the controller 100 checks whether the data communication is completed. Completion of data communication is indicated by the termination of information transfer between the phone and a base station. Here, the word "information" means substantial data excluding data for connecting and maintaining the call between the phone and the base station. If the data communication is completed, the process goes to step 650 to generate an alarm message displayed on the display 120; otherwise, the process proceeds to step 641. The message may be a statement such as "Data transfer completed! Terminate? Y/N". Alternatively, the user may be notified of the alarm message by ringing or by synthesized voices broadcast through a speaker. If the controller 100 detects in step 641 that the end key is inputted, the process goes to step 680 to terminate the communication channel; otherwise, the process returns to step 640.

Subsequent to the generation of the alarm message in step 650, if the controller 100 detects in step 660 the key data input from the key input part 110, the process goes to step 670; otherwise, the process goes to step 661. In step 670, if the end key is detected, the process goes to step 680 to terminate the communication channel. If the end key is not detected in step 670, a function corresponding to the key data is performed in step 675. In step 661, if the controller 100 does not detect any key input in a given time after completing the data communication, the process goes to step 680, and terminates the communication channel; otherwise, the process returns to step 660.

Returning to step 620, if in step 620 the established communication is found not to be data communication, then the enable signal is generated in step 621, and the process goes to step 622. If the controller detects the end data in step 622, the process goes to step 680 to terminate the communication channel; otherwise, the process returns to step 610. In this context, the end data means the end key data inputted through the key input part 110 or the close signal generated by the opening/closing sensor.

Summarizing the description of the embodiments shown in FIGS. 5 and 6, the communication channel is maintained during data communication even when the mobile phone is closed, as the opening/closing sensor 160 is disabled during the data communication. When the data communication is completed, the alarm message is generated. Finally, in FIG. 6, if the end key is inputted, or no key data is generated in a given time, the communication channel is terminated.

While the present invention has been described with specific embodiments shown in the attached drawings, it will be appreciated by those skilled in the art that various changes and modifications may be made thereto without departing from the scope and spirit of the present invention.

What is claimed is:

1. In a mobile phone for wireless communication, said mobile phone including a movable part so as to define an open or closed position, and an opening/closing sensor for generating an open or close signal according to said open or closed position, said opening/closing sensor being enabled or disabled by an enable or disable signal, such that said mobile phone terminates a communication channel upon detection of said close signal, a communication method comprising the steps of:

determining if said communication comprises data communication; and generating said disable signal during said data communication to disable said opening/closing sensor to prevent said sensor from generating said close signal, thereby maintaining said communication channel.

2. The communication method as defined in claim 1, including a further step of generating an alarm message when said data communication is completed.

3. The communication method as defined in claim 1, including a further step of terminating said communication channel when input of key data is not detected within a given time after completing said data communication.

4. The communication method of claim 1, further comprising the step of generating said enable signal during a voice communication, to enable said opening/closing sensor to generate said close signal, thereby terminating said communication channel depending on the open or close signal.

5. In a mobile phone for wireless communication, said mobile phone including a movable part so as to define an open or closed position, and an opening/closing sensor for generating an open or close signal according to said open or closed position, a communication method comprising the step of:

maintaining a communication channel during a data communication when said close signal is generated; and terminating said communication channel when said close signal is generated during a voice communication.

6. The communication method as defined in claim 5, including a further step of terminating said communication channel when said open and close signals are repeatedly generated or when an end key data is inputted.

7. The communication method as defined in claim 5, including a further step of generating an alarm message when said data communication is completed.

8. The communication method as defined in claim 7, including a further step of terminating said communication channel when said open and close signals are repeatedly generated or an end key data is inputted after generating said alarm message.

9. A communication method as defined in claim 5, including a further step of terminating said communication channel when a positional change data corresponding to the position of the movable part of the mobile phone or a key data are not inputted within a given time after completion of said data communication.

10. A mobile phone comprising:

a movable part capable of being positioned so as for the mobile phone to be in an open or close position;

a sensor for generating an open or close signal according to the open or close position, whereby a communication channel is terminated depending upon the open or close signal; and a controller for determining whether an established communication represents a data communication, the controller generating a disable signal during the data communication to disable the sensor from generating said close signal, thereby maintaining said communication channel.

11. The mobile phone of claim 10, wherein the controller generates an enable signal during a voice communication, thereby terminating the communication channel upon detection of the close signal.

12. The mobile phone of claim 10, wherein the controller further generates an alarm message upon completion of the data communication.

13. The mobile phone of claim 10, wherein the controller terminates the communication channel when a key data is not detected within a given time after completion of the data communication.

14. A flip type or folder type mobile phone comprising:

a movable part capable of being positioned so as for the mobile phone to be in an open or close position;

a sensor for generating an open or close signal according to the open or close position of the movable part of the mobile phone; and a controller for determining whether an established communication represents a data communication and for maintaining a communication channel during the data communication regardless of the open or close position of said movable part;

wherein the controller terminates the communication channel during a voice communication upon detection of the close signal.

15. The mobile phone of claim 14, wherein the controller terminates the communication channel when the open or close signals are repeatedly generated or when an end key data is inputted.

16. The mobile phone of claim 14, wherein the controller generates an alarm message upon completion of the data communication.

17. The mobile phone of claim 14, wherein the controller terminates the communication channel when a key data or a positional change data corresponding to the position of the movable part of the mobile phone is not inputted within a given time after completion of the data communication.

* * * * *